(No Model.) 2 Sheets—Sheet 1.
W. DE ST. LAURENT.
GAS LAMP.
No. 350,419. Patented Oct. 5, 1886.
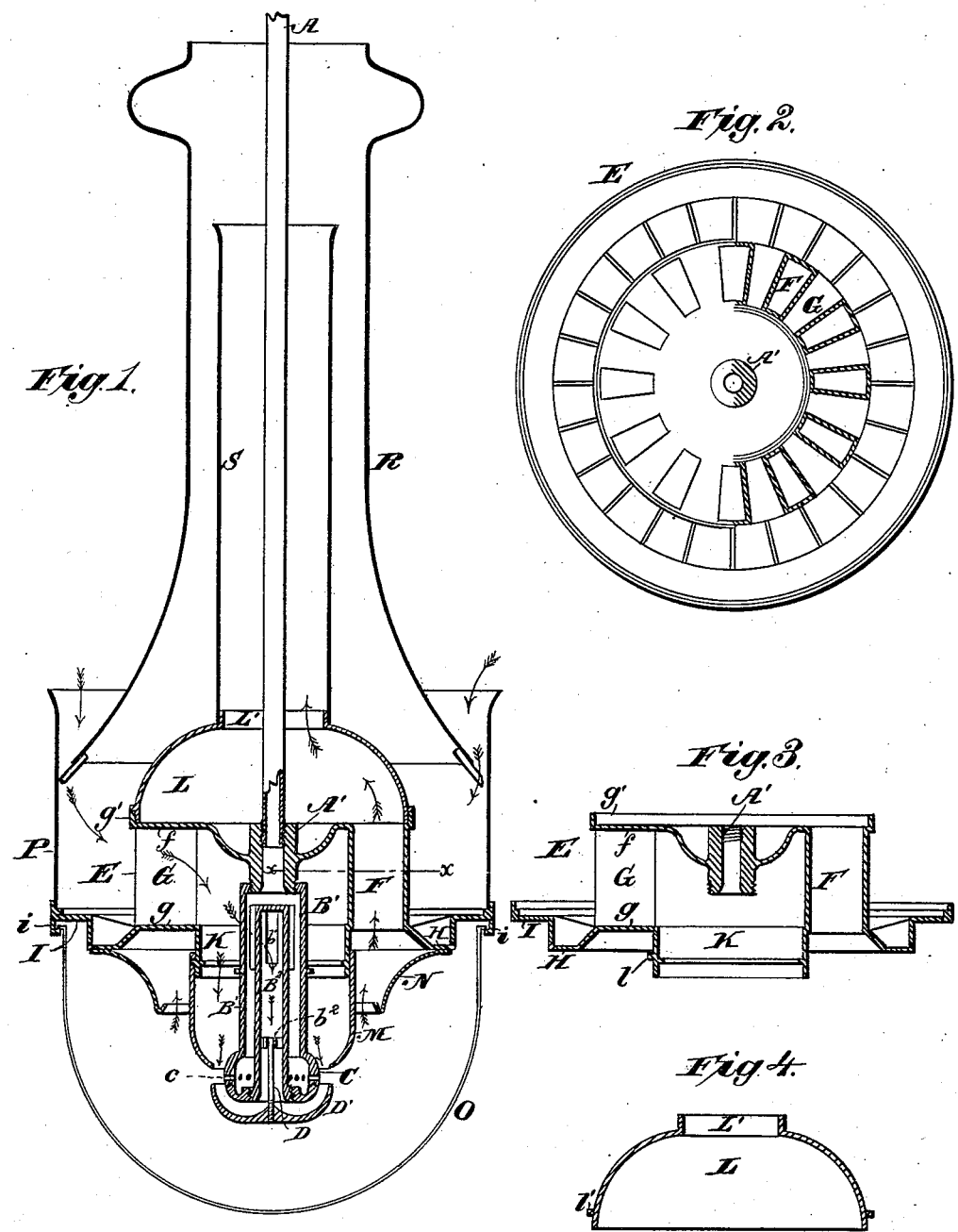
Witnesses.
Robert Everett,
Geo. W. Rea
Inventor:
William de St Laurent.
By James L. Norris
Atty.

(No Model.) 2 Sheets—Sheet 2.

W. DE ST. LAURENT.
GAS LAMP.

No. 350,419. Patented Oct. 5, 1886.

Witnesses.
Robert Everitt,
Geo. H. Rea

Inventor:
William de St Laurent.
By James L. Norris.
Atty.

UNITED STATES PATENT OFFICE.

WILLIAM DE ST. LAURENT, OF LONDON, ENGLAND.

GAS-LAMP.

SPECIFICATION forming part of Letters Patent No. 350,419, dated October 5, 1886.

Application filed July 3, 1886. Serial No. 207,098. (No model.) Patented in France July 21, 1885, No. 170,247.

*To all whom it may concern:*

Be it known that I, WILLIAM DE ST. LAURENT, a subject of the Queen of Great Britain, residing at London, England, have invented new and useful Improvements in Gas-Lamps, of which the following is a specification.

My invention relates to apparatus for giving light; and the purpose thereof is to provide novel means whereby a more complete and perfect combustion of the gas may be obtained, whereby the products of combustion may be entirely consumed, or practically so, and the lighting power of the lamp greatly increased.

To this end my invention consists in the several novel features of construction and combinations of parts, hereinafter fully set forth, and definitely pointed out in the claims following this specification.

Figure 5:
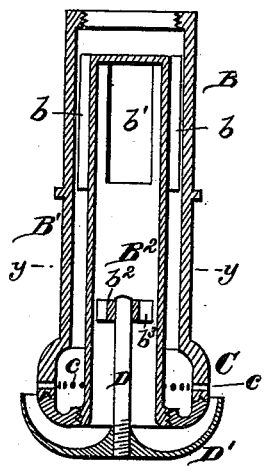
Figure 5A:
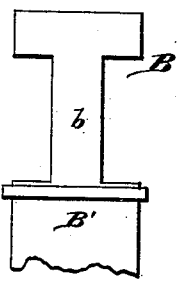
Figure 6:
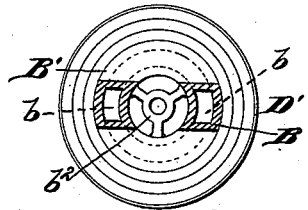
Figure 7:
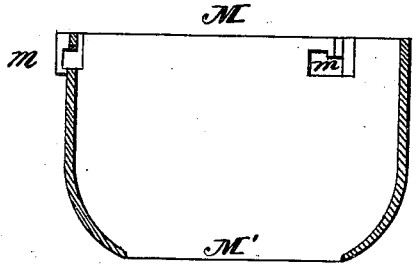
Figure 9:
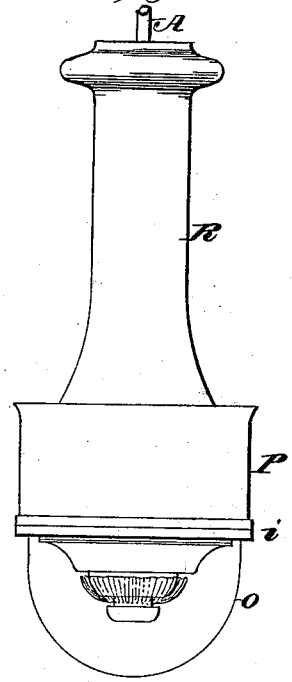

In the accompanying drawings, Figure 1 is a central vertical section of the complete apparatus. Fig. 2 is a horizontal section on the line $x\,x$, Fig. 1. Fig. 3 is a central vertical section in detail of the body of the lamp detached. Fig. 4 is a similar view of the combustion-dome detached. Fig. 5 is a similar view of the burner detached. Fig. $5^a$ is a partial side elevation of Fig. 5. Fig. 6 is a horizontal section of Fig. 5 on the line $y\,y$. Fig. 7 is a central vertical section of the cone, and Fig. 8 a plan view of the same. Fig. 9 is a side elevation showing the lamp in action.

In the said drawings, the reference-letter A designates the gas-conduit, which consists of a pipe of small diameter passing centrally downward through the upper part of the lamp. At its lower end this pipe connects with the burner B. (Shown in detail in Figs. 5, $5^a$, and 6.) This burner is cylindrical at the top where the conduit A enters; but below that point it consists of two parallel passages, $b$, which extend downward to and communicate with a cylindrical body, B', the lower extremity of which is provided with an annular chamber, C. Within the burner is centrally arranged a cylinder, $B^2$, having its upper end, which lies just beneath the neck connecting the burner and the gas-conduit A, closed. The walls of this cylinder form the inner walls of the passages $b$; but upon both sides of said passages the cylinder is pierced with openings $b'$, for a purpose presently to be described.

The annular chamber C, the outer walls whereof project outward, is provided with a series of small gas-openings, $c$, leading outward in radial lines and placed closely together. Within the cylinder $B^2$ is placed a ring, $b^2$, having fingers $b^3$, rigidly connected with the cylinder. The ring gives support to a central rod, D, which supports a cup-shaped deflecting disk, D', lying a little below the lower end of the burner and having its edge or rim arranged just below the plane of the outlet-openings $c$.

Surrounding the burner B is the lamp shell or body E, (shown in detail in Figs. 2 and 3,) consisting of a central neck, A', which connects the conduit A with the burner B, to which is connected a concentric series of inner and outer radial chambers, F and G. The chambers F are closed upon four sides, but open above and below, while the chambers G, which alternate with them, are open outwardly and at their inner ends, but are inclosed above by a wall, $f$, and below by a parallel wall, $g$. Integral with the wall $g$ is formed a downwardly-depending cylindrical shell, K, having outward studs, $l$, at regular intervals, and upon the wall $f$ is formed a rim, $g'$, which receives a dome, L, Fig. 4, having a flange, $l'$, fitting over the rim $g'$ and making a close joint. The dome L has a central opening, L', in its top which surrounds the gas-conduit A, a considerable annular space being left between the two.

Figure 8:
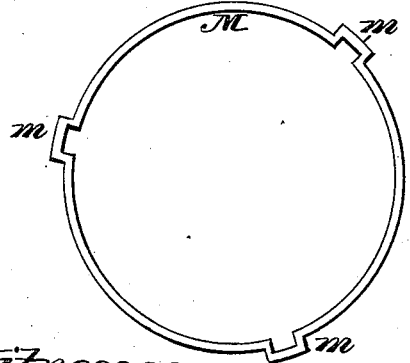

Upon the cylindrical shell K is mounted the heating-cone M, Figs. 7 and 8, having a series of bayonet-joints, $m$, which engage the studs $l$, projecting from the shell K. This cone has an opening, M', which surrounds the annular chamber C of the burner, the edge of the opening being in a plane a little above the series of gas-openings $c$.

An annular imperforate reflector, N, is attached to the flange H, and its wall, which is concave outwardly, extends inwardly and downward to a point about midway of the heating-cone M, an annular space being left between the latter and the edge of the reflector.

A semi-ovoid globe, O, is attached by hookfingers *i* to the outer rim, I, and surrounds the burner and all parts below the said outer rim.

This rim also supports a shell, P, which rises above the combustion-dome L, and this shell in turn supports a chimney, R, an air-passage being left between the base of said chimney and the inner wall of the shell P, as shown in Fig. 1. Upon the combustion-dome L is mounted an inner chimney, S, surrounding the gas-conduit A, and extending upward a suitable distance within the outer chimney, R.

The operation of the lamp is as follows: Gas being introduced through the conduit A flows down through the passages *b* and the cylindrical part B' of the burner into the annular chamber C, whence it escapes through the openings *c*, the combustion taking place at this point. The air-currents produced thereby flow through the openings *b'* in the outer wall of the burner, thence down the cylinder B² into the cup-shaped deflector D', by which they are driven upward into contact with the flame at or near the point of combustion. At the same time the external air, passing between the base of the chimney R and the shell P, enters the alternate chambers G, flows downward through the shell K and heating-cone M, and impinges upon the inner surface of the annulus of flame, causing it to spread outwardly, conforming nearly to the shape of the base of the heating-cone M, but not coming in actual contact with it. The gases and products of combustion pass upward between the heating-cone and the edge of the reflector N, through the chambers F, into the combustion-dome L, and thence out through the chimney S, surrounding the gas-conduit A.

It will readily be seen that by the arrangement described, the exterior air is heated by its passage through the body of the lamp and the heating-cone before it is mingled with the burning-gas, thereby adapting it to support combustion much more perfectly. Moreover, air is brought to the flame by two distinct avenues, and is mingled with the burning gas upon both sides of the flame—that is, upon the outside and the inside—the one current passing centrally through the burner into the cup-shaped deflector and the other passing through the chambers G and heating-cone M. This not only renders the combuston far more perfect, thereby causing a complete consumption of the smoke and other products of combustion, but it serves to deflect the "couronne" of flame into a form most favorable to the production of light and to the generation of heat in the air-passages. It will also be seen that the heated gases of combustion which pass upward through the chambers F, dome L, and chimney S impart heat to the walls of the air-passages G and to the gas-conduit A, thereby raising the temperature of both gas and air before they reach the point of combustion.

In order to prevent the apparatus from unduly heating the apartment, the outer chimney, R, is used, having the circular air-passage between its base and the shell P, which also intercepts the heat from the lamp-body. The air entering at the base of the outer chimney partly passes upward between it and the dome L and chimney S, thereby preventing excessive heating of the parts, and part of said air passes downward to the burner, as already described.

It will be observed that the arrangement of an inner and outer chimney with an intermediate cold-air supply received at the bottom between the shell P and base of the outer chimney, R, serves to prevent excessive heating of the chimneys and obviates smoking or defacing of the ceiling and upper part of the lighting apparatus.

The shell E, with the inner and outer radial air-chambers, F G, rims H I, and shell K are all cast integral, and the heating-cone M, imperforate reflector N, globe O, and inclosing shell P are all closely attached to said casting, thereby forming a series of close chambers from which all cold air is excluded except such as is admitted through the passage between the shell P and base of the outer chimney, R. This air-tight construction is combined with an enlarged capacity of the air-heating space, so that all the air for supporting combustion is thoroughly heated before reaching the flame.

I am aware that gas-lamps have heretofore been provided with double chimneys, with radial heating-chambers surrounding a central burner and gas-conduit, and with burners having concentric air and gas passages. These features, however, I do not broadly claim.

I am aware, also, of the United States Patent to Bower and Thorp, No. 322,038, dated July 14, 1885, and German Patent to Grimston, No. 22,706. My improved lamp differs from those heretofore known in comprising an air deflector suspended from within the central air-passage of the burner and extended outward and upward to a point just beneath the lateral gas-outlets, and an inclosing-shell, P, having a closed bottom, the upper part of said shell being arranged around the base of the outer chimney, R, in such a way as to afford an intermediate air-passage for the air-supply of the lamp, the lower part of which is closed by a close-fitting globe. By this construction the air-supply of the lamp is greatly increased and a brilliant illumination obtained with but little expenditure of gas, owing to the perfect combustion resulting from the extended heating-surfaces and large air-spaces afforded within the lamp.

Any exterior form may be given to the lamp consistent with ornamentation.

What I claim is—

A gas-lamp composed of a central gas-conduit, a burner having separate gas and air passages, and provided at its lower end with radial gas-outlets, a concentric series of inner and outer radial air-chambers surrounding the upper part of said burner, each alternate chamber being closed to the exterior air and the remainder open to the atmosphere, a heating-cone attached to the shell of said chambers and extended downward and inward to a point immediately above the gas-outlets, an annular imperforate reflector surrounding the heating-cone, an air-deflector suspended from within the central air-passage of the burner and extended upward to a point just below the gas-outlets, a close-fitting globe, a combustion-dome above the radial air-chambers, an inner chimney communicating with said dome, an outer chimney, and an inclosing-shell having a closed bottom, the upper part of said shell being arranged around the base of the outer chimney with an intermediate air-passage, substantially as described.

In testimony whereof I have affixed my signature in presence of two witnesses.

WM. DE ST. LAURENT.

Witnesses:
JAMES L. NORRIS,
J. A. RUTHERFORD.